Figure 1:
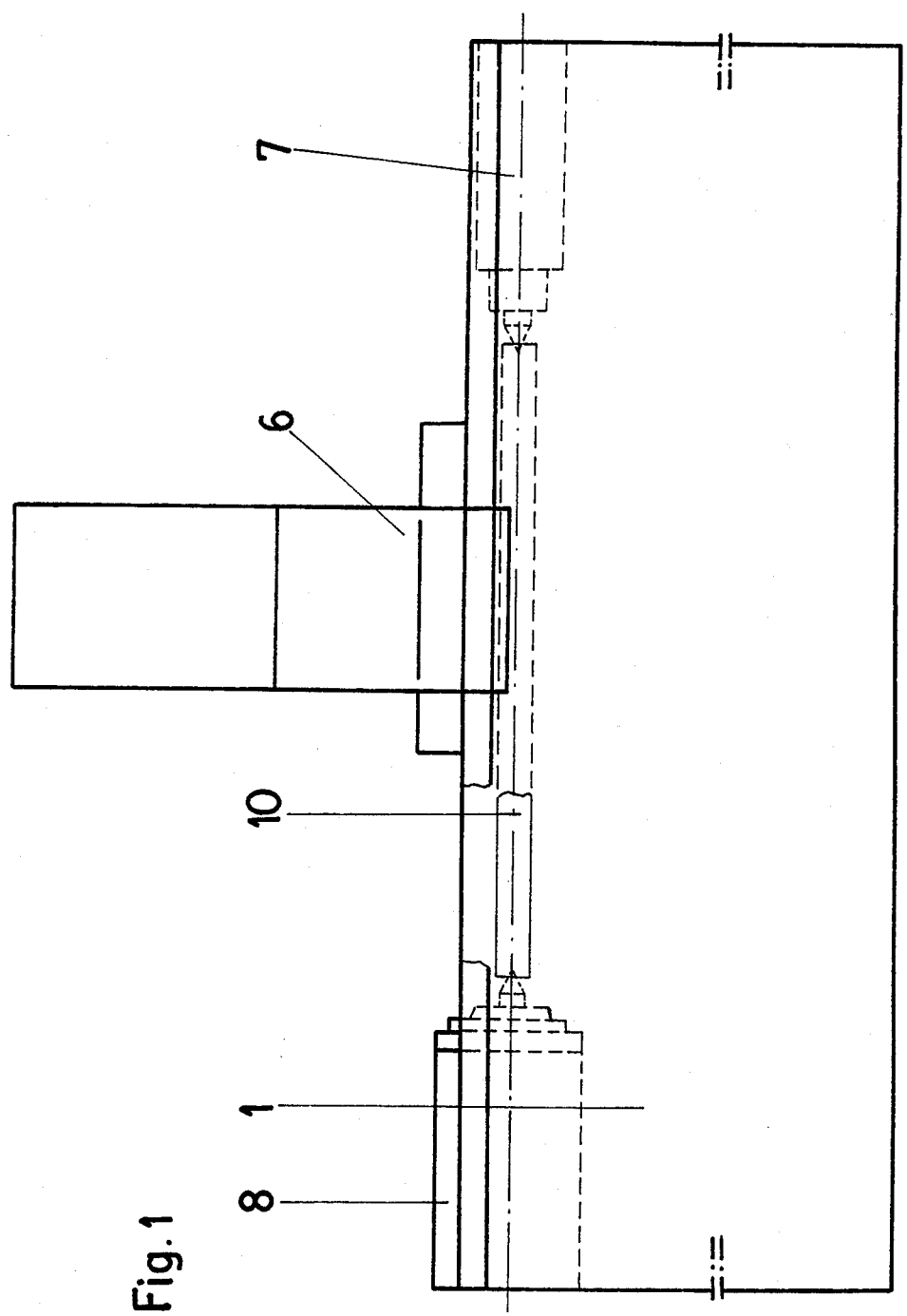

United States Patent [19]
> Niedbała et al.

[11] Patent Number: 4,665,784
[45] Date of Patent: May 19, 1987

[54] MACHINE TOOL

[75] Inventors: Marian Niedbała, Pruszków; Jerzy Rozegnal, Warsaw; Włodzimierz Panków, Pruszków, all of Poland

[73] Assignee: Centrum Badawczo-Konstrukcyjne Obrabiarek, Poland

[21] Appl. No.: 823,417

[22] Filed: Jan. 28, 1986

[30] Foreign Application Priority Data

Feb. 8, 1985 [PL] Poland ................................ 251885

[51] Int. Cl.⁴ ............................................. B23B 17/00
[52] U.S. Cl. .......................................... 82/32; 82/2 D; 82/2 R
[58] Field of Search ............................ 82/2 R, 2 D, 32

[56] References Cited

U.S. PATENT DOCUMENTS

| | | | |
|---|---|---|---|
| 671,521 | 4/1901 | Lang | 82/32 |
| 1,526,241 | 2/1925 | Schneider | 82/32 |
| 1,763,519 | 6/1930 | Heinemann | 82/32 |
| 3,186,267 | 6/1965 | Pabst et al. | 82/32 |
| 3,650,166 | 3/1972 | Schmid | 82/32 |
| 4,180,894 | 1/1980 | Link | 29/36 |
| 4,248,108 | 2/1981 | Tverskoi et al. | 82/2 R |
| 4,475,421 | 10/1984 | Cudnohufsky | 82/25 |

FOREIGN PATENT DOCUMENTS

| | | |
|---|---|---|
| 2329054 | 12/1973 | Fed. Rep. of Germany . |
| 2658146 | 7/1978 | Fed. Rep. of Germany . |
| 1342048 | 12/1973 | United Kingdom . |
| 1393397 | 5/1975 | United Kingdom . |
| 1411705 | 10/1975 | United Kingdom . |
| 1444301 | 7/1976 | United Kingdom . |

Primary Examiner—Nicholas P. Godici
Assistant Examiner—Jerry Kearns

[57] ABSTRACT

A machine tool, especially a lathe, has a pair of ways 2 and 3 of a longitudinal slide 6 and a pair of ways 4 and 5 of a tailstock, between which below ways 2 and 3 a headstock 8 is situated. Location of the axis of the object being machined below the plane of ways 2 and 3 of the longitudinal slide 6 enables passing with the longitudinal slide 6 over the tailstock, the object being machined and the headstock 8.

2 Claims, 2 Drawing Figures

MACHINE TOOL

The subject of the invention is a machine tool, especially a lathe comprising a bed provided with a pair of ways for a longitudinal slide and with situated inside therein another pair of ways for a tailstock and a headstock.

The known systems of lathes are characterized by that the axis of the object being machined is above ways of the bed, whereby depending on the system of the machine tool the ways of the bed may be placed in a horizontal skew plane or a vertical plane. There are also systems of machine tools in which the axis of the object being machined is above ways of the bed and ways of the slide are beyond the axis of the machine tool.

Those skilled in the art know a solution of a lathe, according to the G.F.R. patent specification no. 2329054, which has a headstock installed to perform a to-and-fro motion along the bed, and the spindle has a grip chuck to fix the object to be machined, whose axis is above ways of the bed. It has a rotary head with a slide, provided with a slide to move perpendicularly to the axis of the spindle and a slide to move parallely to the axis of the spindle.

Those skilled in the art know also a single-spindle lathe with at least one tool slide, according to the G.F.R. patent specifications no. 2658146, which has a spindle protractibly and axially mounted in the headstock, and the tool slide is situated above the spindle and can slide only in the transverse direction.

According to the invention, a machine tool, especially a lathe, comprises a bed provided with a pair of ways for a longitudinal slide and with situated inside therein another pair of ways for a tailstock and a headstock. The essence of the invention consists in that the longitudinal slide mounted on a pair of ways encloses the axis of the headstock.

Preferably, the axis of the headstock is situated below the planes of the ways of the longitudinal slide. Due to such a solution the axis of the object being machined, as well as ways for the tailstock and the headstock, are between ways of the slide, below their horizontal plane, and the slide is situated over the object being machined, the tailstock and the headstock, and encloses them.

Location of the object being machined between the ways and below their plane ensures tight and low settlement of the machining area, enables a considerably wider possibility of settlement of an auxiliary equipment at automatization of the machine tool in the range of adapting it to operation in machining stations. This system produces less strain of the machine tool, due to a favourable distribution of forces acting on frames and, consequently, a reduction of the influence of frame strains and contact strains of the ways on the accuracy of the machine tool, and high thermal stability of the machine tool.

Figure 2:
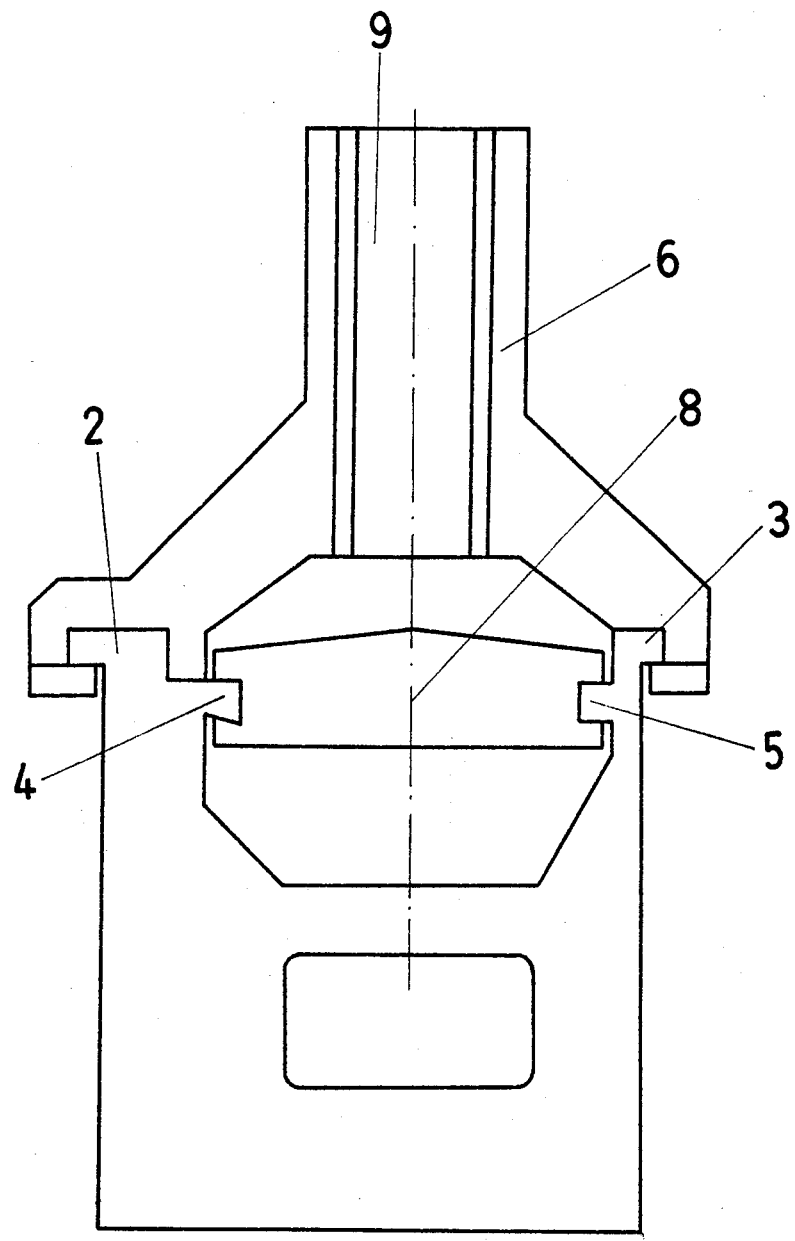

The subject of the invention is shown in example of its realisation in the drawing, in which FIG. 1 presents the front view of the system of the machine tool, especially the lathe, and FIG. 2 the side view of the system of the machine tool.

The machine tool according to the invention has a bed 1 forming a whole together with the base, provided with a pair of ways 2 and 3 on which a longitudinal slide 6 moves horizontally. The way 2 is the basic way which transfers forces and all moments appearing during machining. The way 3 transfers only the forces acting in the perpendicular plane. Besides, the bed 1 has a pair of ways 4 and 5 on which a tailstock 7 is chucked after sliding. The way 4 is appropriated for transferring longitudinal forces and transverse forces in two planes, and the way 5 transfers longitudinal and transverse forces in one plane. To the bed 1, in the plane of ways 4 and 5 and below ways 2 and 3, a headstock 8 is fixed, in the spindle of which the object 10 being machined is fixed. The longitudinal slide 6 has in the plane perpendicular to the axis of the headstock 8 ways on which a tool slide 9 moves. The longitudinal slide 6 moves in the region from the tailstock 7 to the headstock 8, with the possibility of passing over the tailstock 7 with the headstock 8 and the object 10 being machined, which are enclosed by the slide 6.

We claim:

1. A machine tool, especially a lathe, comprising a bed, a first pair of ways provided on said bed, a longitudinal slide movably mounted on said first pair of ways, a vertical tool slide provided on said longitudinal slide, a second pair of ways located on said bed inside said first pair of ways, and a tailstock and a head stock on said second pair of ways, said longitudinal slide enclosing the axis of the headstock.

2. A machine tool according to claim 1, wherein the axis of the headstock is located below planes of said first pair of ways.

* * * * *